United States Patent
Yoshioka et al.

(10) Patent No.: US 11,280,237 B2
(45) Date of Patent: Mar. 22, 2022

(54) HONEYCOMB FILTER

(71) Applicants: NGK Insulators, Ltd., Nagoya (JP);
Honda Motor Co., Ltd., Tokyo (JP)

(72) Inventors: Fumihiko Yoshioka, Nagoya (JP);
Yoshiaki Hatakeyama, Wako (JP);
Noritaka Masumitsu, Wako (JP)

(73) Assignees: NGK Insulators, Ltd., Nagoya (JP);
Honda Motor Co., Ltd., Tokyo (JP)

( * ) Notice: Subject to any disclaimer, the term of this patent is extended or adjusted under 35 U.S.C. 154(b) by 558 days.

(21) Appl. No.: 16/356,239

(22) Filed: Mar. 18, 2019

(65) Prior Publication Data
US 2019/0301326 A1 Oct. 3, 2019

(30) Foreign Application Priority Data

Mar. 30, 2018 (JP) .............................. JP2018-066812

(51) Int. Cl.
| | | |
|---|---|---|
| *F01N 3/022* | (2006.01) | |
| *B01J 23/42* | (2006.01) | |
| *B01J 35/04* | (2006.01) | |
| *B29C 48/11* | (2019.01) | |

(52) U.S. Cl.
CPC ............ *F01N 3/0222* (2013.01); *B01J 23/42* (2013.01); *B01J 35/04* (2013.01); *B29C 48/11* (2019.02)

(58) Field of Classification Search
CPC .... F01N 3/0222; F01N 2330/60; B01J 23/42; B01J 35/04; B01D 46/2418
USPC .............................................. 422/180; 55/523
See application file for complete search history.

(56) References Cited

U.S. PATENT DOCUMENTS

| | | | | |
|---|---|---|---|---|
| 4,515,758 | A * | 5/1985 | Domesle ............... | F01N 3/0222 423/213.2 |
| 4,857,089 | A * | 8/1989 | Kitagawa ................ | F01N 3/035 55/523 |
| 6,753,294 | B1 * | 6/2004 | Brisley ................. | F01N 3/0231 502/439 |
| 7,119,044 | B2 * | 10/2006 | Wei .................... | B01D 53/9431 502/300 |

(Continued)

FOREIGN PATENT DOCUMENTS

| | | |
|---|---|---|
| JP | 2002-177794 A | 6/2002 |
| JP | 2010-167366 A | 8/2010 |

(Continued)

OTHER PUBLICATIONS

Japanese Office Action (Application No. 2018-066812) dated Nov. 9, 2021 (with English translation).

*Primary Examiner* — Tom P Duong
(74) *Attorney, Agent, or Firm* — Burr & Brown, PLLC (57) ABSTRACT

A honeycomb filter, including:
a honeycomb structure,
wherein the honeycomb structure includes a platinum group element-containing catalyst layer,
the platinum group element-containing catalyst layer is disposed only on a side of an inner surface of the partition walls surrounding the outflow cells, and
the platinum group element-containing catalyst layer is disposed in a range of at least up to 35% with respect to an overall length of the cells starting from the outflow end face and is not disposed in a range of at least up to 30% with respect to the overall length of the cells starting from the inflow end face, in an extending direction of the cells of the honeycomb structure.

6 Claims, 4 Drawing Sheets

(56) References Cited

U.S. PATENT DOCUMENTS

| | | | |
|---|---|---|---|
| 8,246,922 B2* | 8/2012 | Boorse | B01D 53/9445 423/213.2 |
| 8,722,000 B2* | 5/2014 | Boorse | F01N 3/0222 423/213.2 |
| 9,238,982 B2* | 1/2016 | Springer | F01N 3/035 |
| 2002/0042344 A1 | 4/2002 | Kondo et al. | |
| 2008/0241011 A1* | 10/2008 | Ohno | B01D 46/0061 422/180 |
| 2008/0260599 A1* | 10/2008 | Ohno | B01J 35/04 422/180 |
| 2010/0184589 A1 | 7/2010 | Miyairi et al. | |
| 2011/0229391 A1* | 9/2011 | Paulus | B01D 53/9468 423/213.2 |
| 2012/0247092 A1 | 10/2012 | Boorse | |
| 2015/0059321 A1* | 3/2015 | Nakayama | F01N 3/022 60/297 |
| 2016/0138448 A1* | 5/2016 | Itoh | F01N 3/0222 422/180 |
| 2017/0016366 A1* | 1/2017 | Suzawa | F01N 3/0821 |

FOREIGN PATENT DOCUMENTS

| | | |
|---|---|---|
| JP | 2014-515445 A | 6/2014 |
| JP | 2015-066536 A1 | 4/2015 |

\* cited by examiner

HONEYCOMB FILTER

The present application is an application based on JP-2018-066812 filed on Mar. 30, 2018 with Japan Patent Office, the entire contents of which are incorporated herein by reference.

BACKGROUND OF THE INVENTION

Field of the Invention

The present invention relates to a honeycomb filter. More particularly, the present invention relates to a honeycomb filter which is excellent in trapping performance for trapping particulate matter contained in exhaust gas and excellent in purification performance for purifying harmful components contained in the exhaust gas.

Description of the Related Art

In recent years, regulations on removal of particulate matter contained in exhaust gas emitted from a gasoline engine are getting stricter around the world, and a honeycomb filter having a honeycomb structure has been used as a filter for removing particulate matter. Hereinafter, the particulate matter may be referred to as "PM". The PM is an abbreviation for "the particulate matter".

Examples of the honeycomb filter can include a honeycomb filter which includes a honeycomb structure having porous partition walls defining a plurality of cells and plugging portions plugging an end portion of any one of the cells. In such a honeycomb filter, each of the porous partition walls is structured to serve as a filter for removing the PM. Specifically, the PM-containing exhaust gas is introduced from an inflow end face of the honeycomb filter, the PM is trapped by the porous partition walls to be filtered, and then the purified exhaust gas is emitted from an outflow end face of the honeycomb filter. By doing so, the PM in the exhaust gas can be removed.

For the purpose of improving the purification performance of such a honeycomb filter, loading a catalyst for purifying the exhaust gas onto the porous partition wall is performed (see Patent Document 1, for example). Examples of the catalyst for purifying the exhaust gas can include a platinum group element-containing catalyst constituted by an exhaust gas purifying catalyst containing a platinum group element. Hereinafter, the platinum group element-containing catalyst may be referred to as a "PGM catalyst". "PGM" is an abbreviation for "platinum group metal". The PGM includes ruthenium, rhodium, palladium, osmium, iridium, and platinum.

[Patent Document 1] JP-A-2015-066536

SUMMARY OF THE INVENTION

In the honeycomb filter for the gasoline engine, it has been studied to use the honeycomb structure in which a porosity of partition wall is high in order to suppress an increase in pressure loss. When the PGM catalyst is loaded onto the partition walls of such a honeycomb structure, the PGM catalyst is loaded so as to be filled in the pores of the porous partition walls.

Conventionally, the honeycomb filter using the honeycomb structure having the high porosity has a problem in that the trapping performance for trapping the PM deteriorates when the PGM catalyst is loaded. The following reasons are conceivable as a cause of the deterioration in the trapping performance. When the PGM catalyst is loaded onto the partition walls in which a porosity is high, the PGM catalyst is filled in order starting from pores with a relatively smaller pore diameter among the pores of the partition walls. For this reason, in the partition walls onto which a predetermined amount of PGM catalyst is loaded, the pores with a relatively smaller pore diameter are closed by the PGM catalyst and the pores with a relatively larger pore diameter remain. Hereinafter, the pores with a relatively smaller pore diameter are referred to as "small pore", and the pores with a relatively larger pore diameter are referred to as "large pore". In the honeycomb structure in which a porosity is high, when the small pores of the partition walls are preferentially closed by the PGM catalyst, the ratio of the large pores of the partition walls is increased and the flow of exhaust gas permeating the partition walls concentrates on the large pores. That is, the exhaust gas becomes difficult to flow in the small pores which contribute to the improvement of the trapping performance, and as a result the trapping performance of the honeycomb filter deteriorates.

The present invention has been made in view of such problems of the prior art. According to the present invention, there is provided a honeycomb filter which is excellent in trapping performance for trapping PM contained in exhaust gas and excellent in purification performance for purifying harmful components contained in the exhaust gas.

According to the present invention, there is provided a honeycomb filter as shown below.

[1] A honeycomb filter including: a honeycomb structure which has porous partition walls disposed so as to surround a plurality of cells as through channels of fluid extending from an inflow end face to an outflow end face; and plugging portions disposed to plug either one of end portions of each of the cells on the side of the inflow end face or the side of the outflow end face, wherein the cells in which the plugging portions are arranged in an end portion on the side of the outflow end face and which are opened on the side of the inflow end face are defined as inflow cells, the cells in which the plugging portions are arranged in end portion on the side of the inflow end face and which are opened on the side of the outflow end face are defined as outflow cells, the honeycomb structure further includes a platinum group element-containing catalyst layer constituted by an exhaust gas purifying catalyst containing a platinum group element, the platinum group element-containing catalyst layer is disposed only on a side of an inner surface of the partition walls surrounding the outflow cells, and the platinum group element-containing catalyst layer is disposed in a range of at least up to 35% with respect to an overall length of the cells starting from the outflow end face and is not disposed in a range of at least up to 30% with respect to the overall length of the cells starting from the inflow end face, in an extending direction of the cells of the honeycomb structure.

[2] The honeycomb filter according to the above [1], wherein a porosity of the platinum group element-containing catalyst layer is from 50 to 90%.

[3] The honeycomb filter according to the above [1] or [2], wherein a thickness of the platinum group element-containing catalyst layer is from 10 to 40 μm.

[4] The honeycomb filter according to any one of the above [1] to [3], the platinum group element-containing catalyst layer is a catalyst layer containing an oxide of at least one element selected from the group consisting of aluminum, zirconium, and cerium.

[5] The honeycomb filter according to any one of the above [1] to [4], wherein in a cross section orthogonal to the extending direction of the cells of the honeycomb structure, a range within 60% of a length from a center of gravity of the cross section to a circumferential edge of the cross section is defined as a central portion of the cross section, and the platinum group element-containing catalyst layer is disposed on the partition walls present at the central portion of the cross section.

[6] The honeycomb filter according to any one of the above [1] to [4], wherein in the cross section orthogonal to the extending direction of the cells of the honeycomb structure, the platinum group element-containing catalyst layer is disposed on the partition walls which surround the outflow cells in an entire area of the cross section.

The honeycomb filter according to the present invention increases the trapping performance for trapping the PM contained in exhaust gas and the purification performance for purifying the harmful components contained in the exhaust gas.

That is, the honeycomb filter according to the present invention has the "platinum group element-containing catalyst layer" on the side of the outflow end face of the honeycomb structure in which a large amount of gas flows, such that the platinum group element-containing catalyst layer can trap the PM and increase the trapping performance. In addition, since the platinum group element-containing catalyst layer is disposed on the side of the outflow end face of the honeycomb structure, the contact between the platinum group element-containing catalyst layer and the exhaust gas is increased, such that the purification performance can be increased. In addition, the platinum group element-containing catalyst layer is not disposed in an inner portion of the partition walls, such that the permeation resistance of the partition walls can be lowered and the pressure loss can be reduced.

DESCRIPTION OF THE PREFERRED EMBODIMENTS

Hereinafter, embodiments of the present invention will be described, but the present invention is not limited to the following embodiments. Therefore, it should be understood that the following embodiments appropriately modified, improved, and the like based on the ordinary knowledge of a person skilled in the art without deviating from the purpose of the invention fall within the scope of the present invention.

(1) Honeycomb Filter (First Embodiment)

Figure 1:
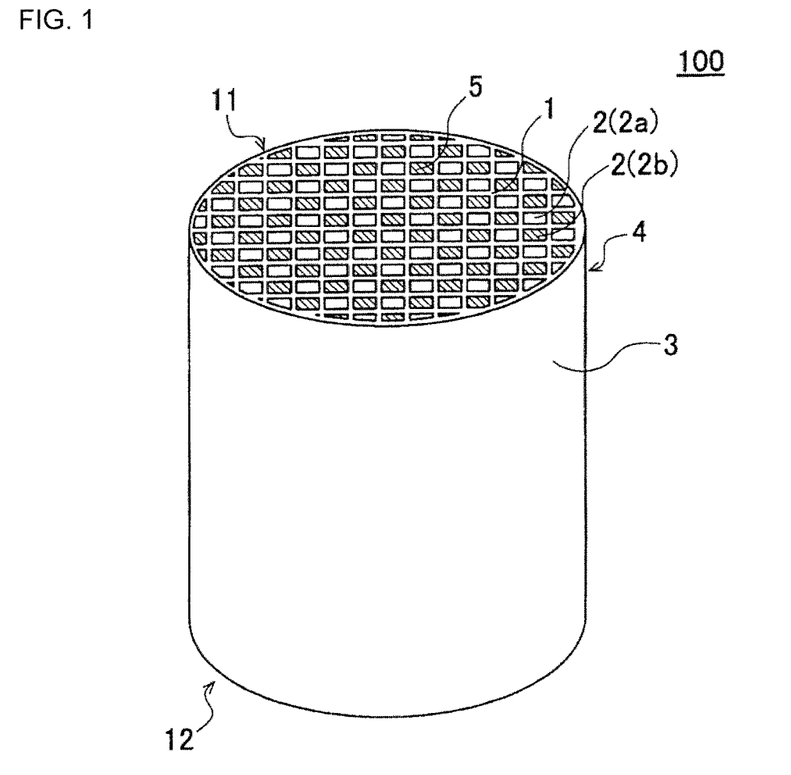
FIG. 1 is a perspective view schematically showing a first embodiment of a honeycomb filter of the present invention.
Figure 2:
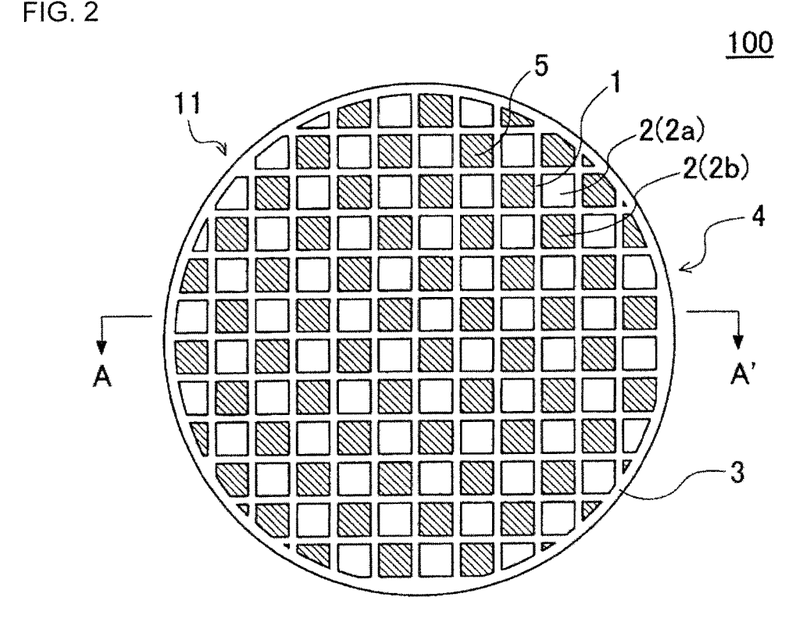
FIG. 2 is a plane view of a side of an inflow end face of the honeycomb filter shown in FIG. 1.
Figure 3:
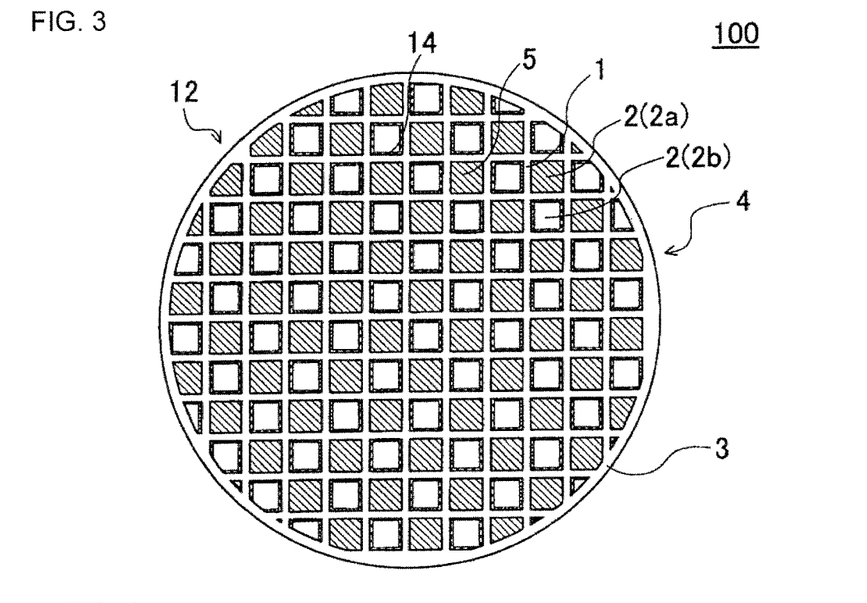
FIG. 3 is a plane view of a side of an outflow end face of the honeycomb filter shown in FIG. 1.
Figure 4:
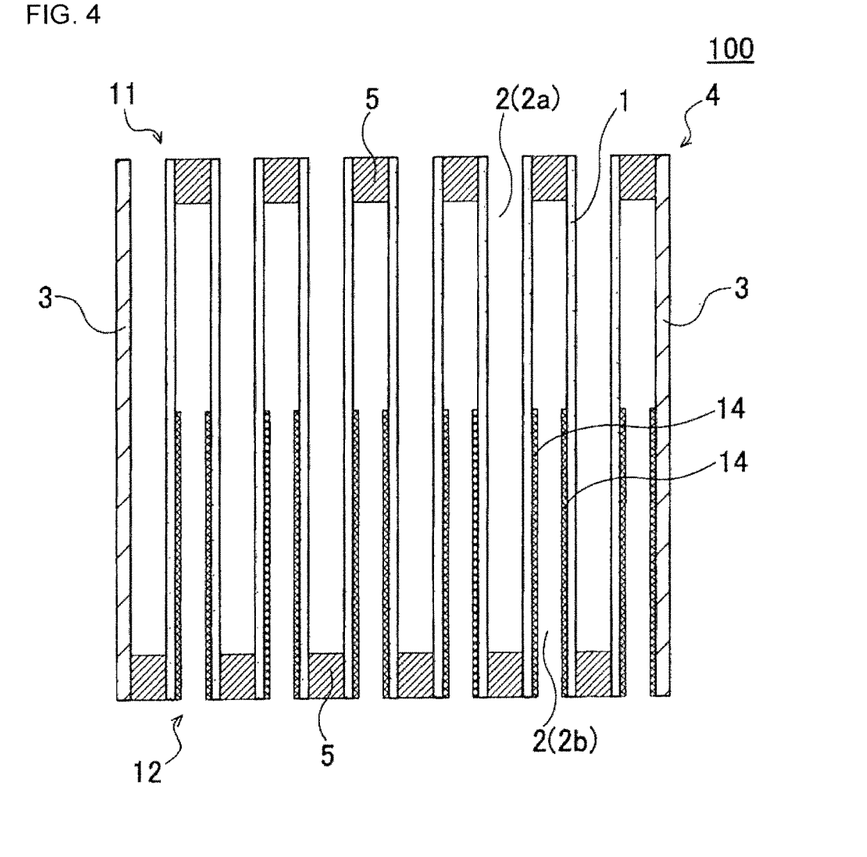
FIG. 4 is a cross-sectional view schematically showing a cross section taken along line A-A' of FIG. 2.

A first embodiment of a honeycomb filter of the present invention is a honeycomb filter 100 as shown in FIGS. 1 to 4. Here, FIG. 1 is a perspective view schematically showing the first embodiment of the honeycomb filter of the present invention. FIG. 2 is a plane view of a side of an inflow end face of the honeycomb filter shown in FIG. 1. FIG. 3 is a plane view of a side of an outflow end face of the honeycomb filter shown in FIG. 1. FIG. 4 is a cross-sectional view schematically showing a cross section taken along line A-A' of FIG. 2.

As shown in FIGS. 1 to 4, the honeycomb filter 100 according to the present embodiment includes a honeycomb structure 4 and plugging portions 5. The honeycomb structure 4 has porous partition walls 1 disposed so as to surround a plurality of cells 2 as through channels of fluid extending from an inflow end face 11 to an outflow end face 12. The honeycomb structure 4 shown in FIGS. 1 to 4 is formed in a round pillar shape having the inflow end face 11 and the outflow end face 12 as both end faces, and further has a circumferential wall 3 on a circumferential side face thereof. That is, the circumferential wall 3 is disposed so as to surround the partition walls 1 disposed in a lattice shape.

The plugging portions 5 are disposed so as to plug either one of end portions of each of the cells 2 on the side of the inflow end face 11 or the side of the outflow end face 12. Hereinafter, among a plurality of cells 2, the cells 2 in which the plugging portions 5 are arranged in an end portion on the side of the outflow end face 12 and which are opened on the side of the inflow end face 11 are defined as "inflow cells 2a". In addition, among the plurality of cells 2, the cells in which the plugging portions 5 are arranged in end portion on the side of the inflow end face 11 and which are opened on the side of the outflow end face 12 are defined as "outflow cells 2b". In the honeycomb filter 100 according to the present embodiment, it is preferable that the inflow cell 2a and the outflow cell 2b are alternately disposed via the partition walls 1.

In the honeycomb filter 100, the honeycomb structure 4 is configured as follows. That is, the honeycomb structure 4 further includes a platinum group element-containing catalyst layer 14 constituted by an exhaust gas purifying catalyst containing a platinum group element. The platinum group element-containing catalyst layer 14 is disposed only on a side of an inner surface of the partition walls 1 surrounding the outflow cells 2b. In addition, the platinum group element-containing catalyst layer 14 is disposed in a range of at least up to 35% with respect to an overall length of the cells 2 starting from the outflow end face 12 in an extending direction of the cells 2 of the honeycomb structure 4. The platinum group element-containing catalyst layer 14 is not disposed in a range of at least up to 30% with respect to the overall length of the cells 2 starting from the inflow end face 11. The overall length of the cells 2 refers to a length from the inflow end face 11 to the outflow end face 12 of the honeycomb structure 4 (in other words, from the outflow end face 12 to the inflow end face 11 of the honeycomb structure 4). The "disposed only on the side of the inner surface of the partition walls 1" means that in a thickness direction of the partition walls 1, the platinum group element-containing catalyst is not present between 0.1 T and 1.0 T starting from a position of the above 0.1 T (where, T indicates the thickness of the partition walls 1) in the thickness direction of the partition walls 1 from the inner surface of the partition walls 1.

Here, the platinum group element includes ruthenium, rhodium, palladium, osmium, iridium, and platinum. Hereinafter, the platinum group element may be referred to as "PGM".

The platinum group element-containing catalyst layer 14 is disposed only on the side of the inner surface of the partition walls 1 surrounding the outflow cells 2b and in a range of at least up to 35% with respect to the overall length of the cells 2 starting from the outflow end face 12. The platinum group element-containing catalyst layer 14 is a catalyst coating layer which is formed by coating the platinum group element-containing catalyst on a predetermined surface of the partition walls 1.

The honeycomb filter 100 includes the honeycomb structure 4 which further includes the platinum group element-containing catalyst layer 14 as described above, and is excellent in trapping performance of trapping the PM and excellent in purification performance for purifying harmful components contained in the exhaust gas. In addition, the platinum group element-containing catalyst layer 14 is not disposed in the inner portion of the partition walls 1, such that the permeation resistance of the partition walls 1 can be lowered and the pressure loss can be reduced.

That is, the honeycomb filter 100 has the "platinum group element-containing catalyst layer 14" on the side of the outflow end face 12 of the honeycomb structure 4 in which the large amount of gas flows, such that the platinum group element-containing catalyst layer 14 can trap the PM and increase the trapping performance. In addition, since the platinum group element-containing catalyst layer 14 is disposed on the side of the outflow end face 12 of the honeycomb structure 4, the contact between the platinum group element-containing catalyst layer 14 and the exhaust gas is increased, such that the purification performance can be increased. For example, the PM trapped by the platinum group element-containing catalyst layer 14 is continuously oxidized and removed at a relatively lower temperature by the catalyst performance of the platinum group element-containing catalyst layer 14.

If the platinum group element-containing catalyst layer 14 is also disposed at portions other than the inner surface of the partition walls 1 surrounding the outflow cells 2b, the pressure loss of the honeycomb filter 100 may be increased. In addition, although the catalyst containing the platinum group element has the excellent catalyst performance for the exhaust gas purification, scarcity is high and an industrial value is also high. Therefore, the platinum group element-containing catalyst layer 14 is disposed only on the predetermined surface of the partition walls 1, such that the manufacturing cost of the honeycomb filter 100 can be reduced.

The porosity of the platinum group element-containing catalyst layer 14 is preferably from 50 to 90%, more preferably from 60 to 80%, and particularly preferably from 60 to 70%. If the porosity of the platinum group element-containing catalyst layer 14 is less than 50%, the pressure loss may be increased. On the other hand, when the porosity of the platinum group element-containing catalyst layer 14 exceeds 90%, the trapping efficiency may deteriorate.

An average pore diameter of the platinum group element-containing catalyst layer 14 is preferably from 1 to 7 µm, more preferably from 1 to 5 µm, and particularly preferably from 1 to 3 µm.

The porosity and the average pore diameter of the platinum group element-containing catalyst layer 14 can be measured by the following method. First, a cross-sectional portion of the platinum group element-containing catalyst layer 14 is observed by a scanning electron microscope (hereinafter, also referred to as "SEM") to acquire the SEM image thereof. The SEM image is magnified to 200 times for observation. The SEM is an abbreviation for "scanning electron microscope". As the scanning electron microscope, for example, a scanning electron microscope "model number: S3200-N" manufactured by Hitachi High-Technologies Corporation can be used. Next, a substantial portion of the platinum group element-containing catalyst layer 14 and a void portion in the platinum group element-containing catalyst layer 14 are binarized by analyzing the acquired SEM image. Then, a percentage of a ratio of the void portion in the platinum group element-containing catalyst layer 14 with respect to a total area of the substantial portion and the void portion of the platinum group element-containing catalyst layer 14 is calculated, and the calculated value is defined as the porosity of the platinum group element-containing catalyst layer 14. In addition, separately, a hollow wall between the respective particle diameters in the SEM image is binarized, and a size of the hollow wall is directly measured with a scale, and the pore diameter of the platinum group element-containing catalyst layer 14 is calculated by the measured value. An average value of the calculated pore diameters is defined as an average pore diameter of the platinum group element-containing catalyst layer 14.

In addition, the platinum group element-containing catalyst layer 14 is preferably a catalyst layer constituted by a platinum group element-containing catalyst having a particle diameter of 1 to 10 µm. With such a configuration, the PM in the exhaust gas can be effectively trapped by the platinum group element-containing catalyst layer 14 disposed on the surface of the partition walls 1. The trapped PM is continuously oxidized and removed at a relatively lower temperature by the catalyst performance of the platinum group element-containing catalyst layer 14.

The thickness of the platinum group element-containing catalyst layer 14 is preferably from 10 to 40 µm, more preferably from 20 to 35 µm, and particularly preferably from 20 to 30 µm. If the thickness of the platinum group element-containing catalyst layer 14 is less than 10 µm, it is not preferable because the improvement amount of the trapping efficiency may be lowered. On the other hand, if the thickness of the platinum group element-containing catalyst layer 14 exceeds 40 µm, it is not preferable because the pressure loss may be increased.

The thickness of the platinum group element-containing catalyst layer 14 can be measured by the following method. First, a cross-sectional portion of the platinum group element-containing catalyst layer is observed by a scanning electron microscope to acquire the SEM image thereof. Next, from the acquired SEM image, the thickness of the platinum group element-containing catalyst layer is directly measured using the scale.

It is preferable that the platinum group element-containing catalyst layer 14 is a catalyst layer containing an oxide of at least one element selected from the group consisting of aluminum, zirconium, and cerium. It is preferable that the catalyst layer containing such an oxide contains from 1 to 3% by mass of a platinum group element with respect to the total mass of the catalyst layer. A composition of the platinum group element-containing catalyst layer 14 can be measured by, for example, fluorescent X-ray analysis (XRF; X-ray fluorescence). Specifically, the composition analysis of the platinum group element-containing catalyst layer 14 can be performed by detecting fluorescent X-rays intrinsic to each element generated by irradiating a sample with X-rays.

The platinum group element-containing catalyst layer 14 is disposed in a range of at least up 35% with respect to the overall length of the cells 2 starting from the outflow end face 12, and is not disposed in a range of at least up to 30% with respect to the overall length of the cell 2s starting from the inflow end face 11. The range in which the platinum group element-containing catalyst layer 14 is disposed may be, for example, up to 40%, up to 50%, and up to 60% with respect to the overall length of the cells 2 starting from the outflow end face 12. In addition, the range in which the platinum group element-containing catalyst layer 14 is not disposed is preferably at least 35% and more preferably at least 40% with respect to the overall length of the cell 2 starting from the inflow end face 11. With such a configuration, the increase in the pressure loss of the honeycomb filter 100 can be effectively suppressed.

In the honeycomb filter 100 shown in FIGS. 1 to 4, in a cross section orthogonal to the extending direction of the cells 2 of the honeycomb structure 4, the platinum group element-containing catalyst layer 14 is disposed on the side of the inner surface of the partition walls 1 surrounding the outflow cells 2b of the entire area of the cross section. However, the platinum group element-containing catalyst layer 14 may be disposed on the side of the inner surface of the partition walls 1 surrounding at least one outflow cells 2b in the cross section. That is, in a range of at least up to 40% with respect to the overall length starting from the outflow end face 12 of the honeycomb structure 4, the platinum group element-containing catalyst layer 14 may be disposed on the side of the inner surface of the partition walls 1 surrounding at least one outflow cells 2b.

The porosity of the partition walls 1 of the honeycomb structure 4 is preferably from 50 to 70%, more preferably from 55 to 65%, and particularly preferably from 60 to 65%. The porosity of the partition walls 1 is a value measured by a mercury porosimetry. The porosity of the partition walls 1 can be measured using, for example, AutoPore 9500 (product name) manufactured by Micromeritics Instrument Corp. If the porosity of the partition walls 1 is less than 50%, it is not preferable because a permeation resistance of the partition walls 1 is increased and the pressure loss is increased. If the porosity of the partition walls 1 exceeds 70%, it is not preferable because the strength is remarkably decreased.

The average pore diameter of the partition walls 1 is preferably from 10 to 25 μm, more preferably from 10 to 20 and particularly preferably from 15 to 20 μm. The average pore diameter of the partition walls 1 is a value measured by the mercury porosimetry. The average pore diameter of the partition walls 1 can be measured using, for example, AutoPore 9500 (product name) manufactured by Micromeritics Instrument Corp. If the average pore diameter of the partition walls 1 is less than 10 μm, it is not preferable because a permeation resistance of the partition walls 1 is increased and the pressure loss is increased. If the average pore diameter of the partition walls 1 exceeds 25 μm, it is not preferable because the gas flow concentrates on the portion of the large pore and therefore the trapping efficiency deteriorates.

In the honeycomb structure 4, the thickness of the partition walls 1 is preferably from 0.15 to 0.38 mm, more preferably from 0.18 to 0.33 mm, and particularly preferably from 0.20 to 0.31 mm. The thickness of the partition walls 1 can be measured using, for example, the scanning electron microscope or the microscope. If the thickness of the partition walls 1 is less than 0.15 mm, the sufficient strength may not be obtained. On the other hand, if the thickness of the partition walls 1 exceeds 0.38 mm, the pressure loss may be increased when the catalyst is loaded onto the partition walls 1.

The shape of the cells 2 formed in the honeycomb structure 4 is not particularly limited. For example, in the cross section orthogonal to the extending direction of the cells 2, the shape of the cells 2 may be a polygon, a circle, an ellipse, or the like. Examples of the polygon can include a triangle, a quadrangle, a pentagon, a hexagon, an octagon and the like. The shape of the cells 2 is preferably a triangle, a quadrangle, a pentagon, a hexagon, or an octagon. As for the shape of the cells 2, all the cells2 may have the same shape, or the cells2 may have different shapes each other. For example, although not shown, quadrangular cells and octagonal cells may be mixed. As for the size of the cells 2, all the cells2 may have the same size, or the cells2 may have different sizes each other. For example, although not shown, of a plurality of cells, some cells may have a larger size, and the other cells may have a smaller size. In the present invention, the cell means a space surrounded by the partition walls.

A cell density of the cells 2 defined by the partition walls 1 is preferably from 31 to 54 cells/cm$^2$, and more preferably from 39 to 47 cells/cm$^2$. With such a configuration, the honeycomb filter can be suitably used as a filter for trapping PM in exhaust gas emitted from an engine of an automobile or the like.

The circumferential wall 3 of the honeycomb structure 4 may be formed integrally with the partition walls 1 or may be a circumferential coating layer formed by coating a circumferential coating material so as to surround the partition walls 1. Although not shown, at the time of the manufacturing, the circumferential coating layer may be provided on the circumferential side of the partition walls after the partition walls are integrally formed with the circumferential wall and then the formed circumferential wall is removed by the known methods such as grinding processing.

The shape of the honeycomb structure 4 is not particularly limited. The shape of the honeycomb structure 4 may include a pillar shape in which the inflow end face 11 and the outflow end face 12 include a circular shape, an elliptical shape, and a polygonal shape.

The size of the honeycomb structure 4, for example, the length in the extending direction of the cells 2 of the honeycomb structure 4 (hereinafter, also referred to as "overall length") or the size of the cross section (hereinafter also referred to as "cross-sectional area") orthogonal to the extending direction of the cells 2 of the honeycomb structure 4 is not particularly limited. Each size may be appropriately selected so as to obtain the optimum purification performance at the time of using the honeycomb filter 100. The overall length of the honeycomb structure 4 is preferably from 90 to 160 mm, and more preferably from 120 to 140 mm. In addition, the cross-sectional area of the honeycomb structure 4 is preferably from 8000 to 16000 mm$^2$, and more preferably from 10000 to 14000 mm$^2$.

The material of the partition walls 1 preferably is at least one selected from the group consisting of cordierite, silicon carbide, a silicon-silicon carbide based composite material, mullite, alumina, aluminum titanate, silicon nitride, and silicon carbide-cordierite based composite material. The material constituting the partition walls 1 is preferably a material containing 30% by mass or more, more preferably a material containing 40% by mass or more, and particularly preferably a material including 50% by mass or more of the materials listed in the above group. In the honeycomb filter 100 of the present embodiment, the material constituting the partition walls 1 is particularly preferably cordierite.

(2) Honeycomb Filter (Second Embodiment)

Figure 5:
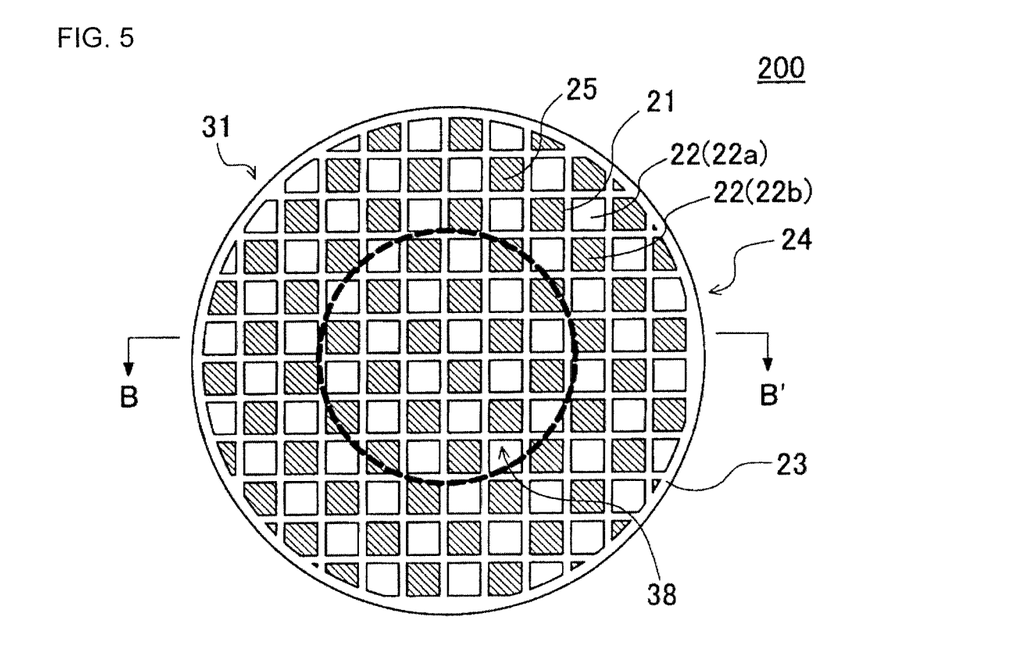
FIG. 5 is a plane view of a side of an inflow end face schematically showing a second embodiment of a honeycomb filter of the present invention.
Figure 6:
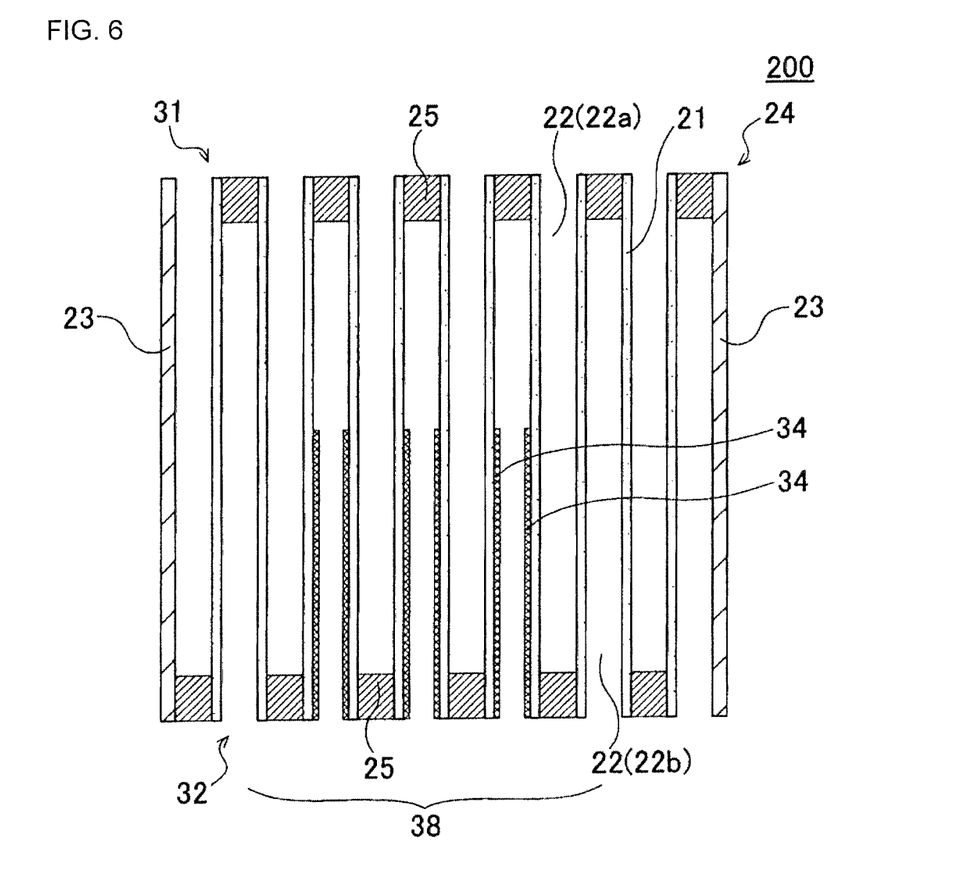
FIG. 6 is a cross-sectional view schematically showing a cross section taken along line B-B' of FIG. 5.

Next, a second embodiment of a honeycomb filter according to the present invention will be described below. The second embodiment of a honeycomb filter according to the present invention is a honeycomb filter 200 as shown in FIGS. 5 and 6. Here, FIG. 5 is a plane view of a side of an inflow end face schematically showing the second embodiment of the honeycomb filter according to the present invention. FIG. 6 is a cross-sectional view schematically showing a cross section taken along line B-B' of FIG. 5.

As shown in FIGS. 5 and 6, the honeycomb filter 200 according to the present embodiment is a honeycomb filter 200 which includes a honeycomb structure 24 and plugging portions 25. The honeycomb structure 24 has porous partition walls 21 disposed so as to surround a plurality of cells 22 as through channels of fluid extending from an inflow end face 31 to an outflow end face 32. A circumferential side surface of the honeycomb structure 24 is further provided with a circumferential wall 23 so as to surround the partition walls 21.

The plugging portions 25 are disposed so as to plug either one of end portions of each of the cells 22 on the side of the inflow end face 31 or the side of the outflow end face 32. The cells 22 in which the plugging portions 25 are disposed at the end portion on the side of the outflow end face 32 are defined as an "inflow cells 22a" and the cells 22 in which the plugging portions 25 are disposed at the end portion on the side of the inflow end face 31 are defined as an "outflow cells 22b".

In addition, in the honeycomb filter 200, the honeycomb structure 24 further includes a platinum group element-containing catalyst layer 34 constituted by an exhaust gas purifying catalyst containing a platinum group element. The platinum group element-containing catalyst layer 34 is disposed only on a side of an inner surface of the partition walls 21 surrounding the outflow cells 22b. In addition, the platinum group element-containing catalyst layer 34 is disposed in a range of at least up 35% with respect to the overall length of the cells 22 starting from the outflow end face 32, and is not disposed in a range of at least up to 30% with respect to the overall length of the cells 22 starting from the inflow end face 31.

In the honeycomb filter 200, the platinum group element-containing catalyst layer 34 is disposed on the partition walls 21 present in a central portion 38 of the honeycomb structure 24. That is, the platinum group element-containing catalyst layer 34 is disposed only on a side of an inner surface of the partition walls 21 surrounding the outflow cells 22b among the partition walls 21 present in the central portion 38. Here, in a cross section orthogonal to the extending direction of the cells 22 of the honeycomb structure 24, the central portion 38 means a range within 60% of a length from a center of gravity of the cross section to a circumferential edge of the cross section. That is, in the honeycomb filter 200 according to the present embodiment, the platinum group element-containing catalyst layer 34 is preferentially disposed only at the "central portion 38" in the cross section of the above-described honeycomb structure 24, and the platinum group element-containing catalyst layer 34 is not disposed at portions other than the central portion 38.

In the honeycomb filter 200, since the platinum group element-containing catalyst layer 34 is disposed only at the central portion 38 at which a flow rate of exhaust gas is increased, it is possible to favorably maintain the trapping performance of the honeycomb filter 200, suppress the increase in pressure loss, and further reduce the manufacturing cost.

In the honeycomb filter 100 shown in FIGS. 1 to 4, in a cross section orthogonal to the extending direction of the cells 2 of the honeycomb structure 4, the platinum group element-containing catalyst layer 14 is disposed on the side of the inner surface of the partition walls 1 surrounding the outflow cells 2b of the entire area of the cross section. It is preferable that the honeycomb filter 200 shown in FIGS. 5 and 6 has the same structure as the honeycomb filter 100 shown in FIGS. 1 to 4 except that the range in which the platinum group element-containing catalyst layer 34 is disposed is limited to the central portion 38 of the honeycomb structure 24.

(3) Method for Manufacturing Honeycomb Filter

The method for manufacturing a honeycomb filter according to the present invention is not particularly limited, and for example, the following method can be mentioned.

First, a plastic kneaded material for manufacturing partition walls of a honeycomb structure is prepared. The kneaded material for manufacturing the partition walls of the honeycomb structure can be prepared by appropriately adding additives such as a binder, a pore former, and water to a raw material powder for preparing a suitable material for the above-mentioned partition walls. Examples of the raw material powder may include powder of alumina, talc, kaolin, and silica. Examples of the binder may include methylcellulose, hydroxypropyl methylcellulose or the like. In addition, examples of the additives may include a surfactant Next, a pillar honeycomb formed body having partition walls for defining a plurality of cells and a circumferential wall disposed to surround the partition walls is prepared by extruding the thus obtained kneaded material. Next, the obtained honeycomb formed body is dried with microwave and hot air, for example.

Next, the plugging portions are formed on the dried honeycomb formed body. The method for forming plugging portions can be performed according to the conventionally known method for manufacturing a honeycomb filter. For example, first, a mask is applied to the inflow end face of the honeycomb formed body so that the inflow cell is covered. Thereafter, the end portion having the mask of the honeycomb formed body is immersed in a plugging slurry, and an open end having no mask of the outflow cell is filled with the plugging slurry. Thereafter, even for the outflow end face of the honeycomb formed body, the open end of the inflow cell is filled with the plugging slurry by the same method as described above. Thereafter, the honeycomb formed body having the plugging portions formed therein is further dried with a hot air dryer.

Next, the honeycomb formed body having the plugging portions formed therein is fired to prepare a honeycomb filter precursor prior to disposing the platinum group element-containing catalyst layer. A firing temperature and a firing atmosphere at the time of firing the honeycomb formed body differ depending on a raw material for preparing the honeycomb formed body, and those skilled in the art can select a firing temperature and a firing atmosphere most suitable for the selected material.

Next, the platinum group element-containing catalyst for preparing the platinum group element-containing catalyst layer is prepared. As the platinum group element-containing catalyst, for example, a catalyst in which a platinum group element is loaded onto an aluminum oxide having a particle diameter of 1 to 10 µm can be used. Such aluminum oxide is applied in a zone coat within a range of at least up to 35% with respect to the overall length of the cells starting from the outflow end face of the honeycomb filter precursor. As a specific method of the zone coat, for example, the following methods can be mentioned. First, a catalyst layer forming slurry containing catalyst powder such as aluminum oxide onto which the platinum group element is loaded and an appropriate solvent (for example, ion exchanged water) and a dispersing agent is prepared. Next, the catalyst layer forming slurry is poured from the outflow end face of the honeycomb filter precursor and sucked from the inflow end face, such that the platinum group element-containing catalyst is applied to the surface of the partition walls surrounding the outflow cells in which the side of the outflow end face of the honeycomb filter precursor is open. Thereafter, the zone-coated platinum group element-containing catalyst is fired at 500° C. to prepare the platinum group element-containing catalyst layer. By adjusting at least one of the viscosity of the catalyst layer forming slurry and the pressure at the time of suction, the platinum group element-containing catalyst layer is disposed only on the surface of the partition walls. In addition, as a method of the zone coat, a platinum group element-containing catalyst layer can also be applied on the surface of the partition walls by dipping the catalyst layer forming slurry. As described above, the honeycomb filter according to the present invention can be manufactured.

EXAMPLES

Hereinafter, the present invention will be described more specifically with reference to examples, but the present invention is not limited to these examples.

Example 1

First, alumina, talc, kaolin, and silica raw materials for preparing partition walls of a honeycomb structure were prepared. 2 parts by mass of a dispersing medium and 7 parts by mass of an organic binder were each added to the prepared alumina, talc, kaolin, and silica raw materials (total 100 parts by mass), mixed, and kneaded to prepare kneaded material. As the dispersing medium, water was used. As the organic binder, methyl cellulose was used. As the dispersing agent, a surfactant was used.

Next, the kneaded material was extruded using a die for preparing a honeycomb formed body to obtain a honeycomb formed body whose overall shape is a round pillar shape. The shape of the cell of the honeycomb formed body was a rectangle.

Next, after the honeycomb formed body was dried by a microwave dryer and completely dried by a hot air dryer again, both end faces of the honeycomb formed body were cut and adjusted to predetermined dimensions.

Next, plugging portion were formed on the dried honeycomb formed body. Specifically, first, a mask was applied to the inflow end face of the honeycomb formed body so that the inflow cell is covered. Thereafter, the end portion having the mask of the honeycomb formed body is immersed in a plugging slurry, and an open end having no mask of the outflow cell is filled with the plugging slurry. Thereafter, even for the outflow end face of the honeycomb formed body, the open end of the inflow cell is filled with the plugging slurry by the same method as described above.

Thereafter, the honeycomb formed body having the plugging portions formed therein is further dried with a hot air dryer.

Next, the dried honeycomb formed body was degreased and fired to prepare a honeycomb filter precursor prior to disposing the platinum group element-containing catalyst layer.

Next, the platinum group element-containing catalyst layer was prepared on the side of the inner surface of the partition walls surrounding the outflow cells of the honeycomb filter precursor by the following method. First, a catalyst layer forming slurry containing a powder of aluminum oxide onto which palladium as a platinum group element is loaded, ion exchanged water, and a dispersing agent was prepared. Next, the catalyst layer forming slurry was poured from the outflow end face of the honeycomb filter precursor, and the poured catalyst layer forming slurry was sucked from the inflow end face while adjusting a pressure at the time of suction so that the platinum element-containing catalyst layer is applied only to the inner surface of the partition walls. By doing so, the platinum group element-containing catalyst was applied to the surface of the partition walls surrounding the outflow cells in which the side of the outflow end face of the honeycomb filter precursor is open. Thereafter, the platinum group element-containing catalyst applied to the surface of the partition walls was fired at 500° C. to prepare the platinum group element-containing catalyst layer.

The shape of the honeycomb filter of Example 1 was a round pillar shape in which the shape of the inflow end face and the outflow end face was a circle. In addition, a length in an extending direction of the cells of the honeycomb filter was 127 mm. A diameter of the end face of the honeycomb filter was 118 mm. In the honeycomb structure constituting the honeycomb filter, a thickness of the partition walls was 0.22 mm, and a cell density was 47 cells/cm$^2$. A porosity of the partition walls of the honeycomb structure was 63%.

In addition, the platinum group element-containing catalyst layer was disposed only on the side of the inner surface of the partition walls surrounding the outflow cells. The platinum group element-containing catalyst layer was disposed in a range (that is, a range of 60% with respect to the overall length of the cell starting from the outflow end face) of up to 60% with respect to the overall length of the cell starting from the outflow end face of the honeycomb structure. A porosity of the platinum group element-containing catalyst layer was 65%. Table 1 shows a disposition range and a disposition spot of the platinum group element-containing catalyst

TABLE 1

| | Disposition range of platinum group element-containing catalyst | Disposition spot of platinum group element-containing catalyst |
|---|---|---|
| Comparative Example 1 | 100% | In pore of partition wall |
| Comparative Example 2 | 60% from outflow end face | In pore of partition wall |
| Example 1 | 60% from outflow end face | Surface of partition wall surrounding outflow cell |
| Example 2 | 50% from outflow end face | Surface of partition wall surrounding outflow cell |
| Example 3 | 40% from outflow end face | Surface of partition wall surrounding outflow cell |
| Example 4 | 35% from outflow end face | Surface of partition wall surrounding outflow cell |

TABLE 1-continued

| | Disposition range of platinum group element-containing catalyst | Disposition spot of platinum group element-containing catalyst |
|---|---|---|
| Example 5 | 70% from outflow end face | Surface of partition wall surrounding outflow cell |

With respect to the honeycomb filter of Example 1, "trapping efficiency performance", "pressure loss performance", and "exhaust gas purification performance" were evaluated by the following method. The results are shown in Table 2.

(Trapping Efficiency Performance)

First, an exhaust gas purifying apparatus using a honeycomb filter of each example as an exhaust gas purifying filter was manufactured. The manufactured exhaust gas purification apparatus was connected to a side of an outlet of an engine exhaust manifold of a 1.2 L direct injection type gasoline engine vehicle to measure the number of soot contained in the gas emitted from the outlet of the exhaust gas purification apparatus by a PN measurement method. The "PN measurement method" is a measurement method proposed by a particle measurement program (abbreviated as PMP) at the Conference of Exhaust Gas Energy Experts (abbreviated as GRPE) of Automobile Standard Harmonized World Forum (abbreviated as WP29) in the European Economic Committee (abbreviated as ECE) of the United Nations (abbreviated as UN). Specifically, in the determination of the number of soot, the cumulative number of soot emitted after traveling in a Worldwide harmonized Light duty Test Cycle (WLTC) mode is defined as the number of soot of the exhaust gas purifying apparatus to be determined, and the trapping efficiency is measured. The trapping efficiency performance was evaluated on the basis of the following evaluation criteria which were based on the measured values of each trapping efficiency. When the values of the trapping efficiency of the exhaust gas purifying apparatus using the honeycomb filter of Comparative Example 1 was set to be 100% in a column of "trapping efficiency ratio (%)" in the following Table 2, the values (%) of the trapping efficiency of the exhaust gas purifying apparatus using the honeycomb filters of each example were shown.

Evaluation "excellent": When the value of the trapping efficiency of the exhaust gas purifying apparatus using the honeycomb filter of Comparative Example 1 was set to be 100% and when the value of the trapping efficiency of the exhaust gas purifying apparatus using the honeycomb filter to be evaluated was 130% or more, the evaluation was "excellent".

Evaluation "good": When the value of the trapping efficiency of the exhaust gas purifying apparatus using the honeycomb filter of Comparative Example 1 was set to be 100% and when the value of the trapping efficiency of the exhaust gas purifying apparatus using the honeycomb filter to be evaluated exceeded 120% and was less than 130%, the evaluation was "good".

Evaluation "permission": When the value of the trapping efficiency of the exhaust gas purifying apparatus using the honeycomb filter of Comparative Example 1 was set to be 100% and when the value of the trapping efficiency of the exhaust gas purifying apparatus using the honeycomb filter to be evaluated exceeded 100% and was 120% or less, the evaluation was "permission".

(Pressure Loss Performance)

Exhaust gas emitted from a 1.4 L direct injection type gasoline engine was introduced into honeycomb filters of each example and soot in the exhaust gas was trapped in partition walls of the honeycomb filter. The soot was trapped until the amount of soot deposited per unit volume (1 L) of the honeycomb filter reached 1 g/L. Then, the engine exhaust gas of 200° C. was flowed in at a flow rate of 1.0 Nm$^3$/min in a state in which the deposited amount of soot was 1 g/L, and the pressure between the side of the inflow end face and the side of the outflow end face of the honeycomb filter was measured. Then, a pressure loss (kPa) of the honeycomb filter was obtained by calculating a pressure difference between the side of the inflow end face and the side of the outflow end face. The pressure loss performance was evaluated on the basis of the following evaluation criteria which were based on the measured values of each pressure loss. In the column of "pressure loss ratio (%)" in the following Table 2, values (%) of the pressure loss of the honeycomb filters of each example were shown when the value of the pressure loss of the honeycomb filter of Comparative Example 1 was 100%.

Evaluation "excellent": When the value of the pressure loss of the honeycomb filter of Comparative Example 1 was set to be 100% and when the value of the pressure loss of the honeycomb filter to be evaluated was less than 90%, the evaluation was "excellent".

Evaluation "good": When the value of the pressure loss of the honeycomb filter of Comparative Example 1 was set to be 100% and when the value of the pressure loss of the honeycomb filter to be evaluated was 90% or more and less than 95%, the evaluation was "good".

Evaluation "permission": When the value of the pressure loss of the honeycomb filter of Comparative Example 1 was set to be 100% and when the value of the pressure loss of the honeycomb filter to be evaluated was 95% or more and less than 100%, the evaluation was "permission".

(Exhaust Gas Purification Performance)

First, an exhaust gas purifying apparatus using a honeycomb filter of each example as an exhaust gas purifying filter was manufactured. The manufactured exhaust gas purification apparatus was connected to a side of an outlet of an engine exhaust manifold of a 1.2 L direct injection type gasoline engine vehicle to measure a concentration of NOx contained in the gas emitted from the outlet of the exhaust gas purification apparatus and obtain a purification efficiency of NOx. The exhaust gas purification performance was evaluated on the basis of the following evaluation criteria which were based on the measured values of the purification efficiency of each NOx. When the values of the purification efficiency of NOx of the exhaust gas purifying apparatus using the honeycomb filter of Comparative Example 1 was set to be 100% in a column of "purification efficiency ratio (%) of NOx" in the following Table 2, the values (%) of the purification efficiency of NOx of the exhaust gas purifying apparatus using the honeycomb filters of each example were shown.

Evaluation "excellent": When the value of the purification efficiency of NOx of the exhaust gas purifying apparatus using the honeycomb filter of Comparative Example 1 was set to be 100% and when the value of the purification efficiency of NOx of the exhaust gas purifying apparatus using the honeycomb filter to be evaluated was 120% or more, the evaluation was "excellent".

Evaluation "good": When the value of the purification efficiency of NOx of the exhaust gas purifying apparatus using the honeycomb filter of Comparative Example 1 was set to be 100% and when the value of the purification efficiency of NOx of the exhaust gas purifying apparatus using the honeycomb filter to be evaluated exceeded 110% and was less than 120%, the evaluation was "good".

Evaluation "permission": When the value of the purification efficiency of NOx of the exhaust gas purifying apparatus using the honeycomb filter of Comparative Example 1 was set to be 100% and when the value of the purification efficiency of NOx of the exhaust gas purifying apparatus using the honeycomb filter to be evaluated exceeded 100% and was 110% or less, the evaluation was "permission".

Evaluation "no permission": When the value of the purification efficiency of NOx of the exhaust gas purifying apparatus using the honeycomb filter of Comparative Example 1 was set to be 100% and when the value of the purification efficiency of NOx of the exhaust gas purifying apparatus using the honeycomb filter to be evaluated was 100% or less, the evaluation was "no permission".

face of the honeycomb filter precursor, the platinum group element-containing catalyst was loaded into pores of the partition walls in a range of 60% from the outflow end face of the honeycomb filter precursor.

(Result)

It was confirmed that the honeycomb filters of Examples 1 to 5 exceeded the respective performances of the honeycomb filter of Comparative Example 1 serving as a reference, in all evaluations of the "trapping efficiency performance", the "pressure loss performance", and the "exhaust gas purification performance". Therefore, it has been found that the honeycomb filters of Examples 1 to 5 are also excellent in the trapping performance and the purification performance, and can suppress the increase in the pressure loss as compared with the conventional honeycomb filter. On the other hand, compared with the honeycomb filter of Comparative Example 1, in the honeycomb filter of Comparative Example 2, the improvement in the "trapping

TABLE 2

| | Trapping efficiency (%) | Pressure loss (kPa) | Purification efficiency of NOx (%) | Trapping efficiency ratio (%) | Pressure loss ratio (%) | Purification efficiency ratio of NOx (%) | Trapping efficiency performance | Pressure loss performance | Exhaust gas purification performance |
|---|---|---|---|---|---|---|---|---|---|
| Comparative Example 1 | 60.00 | 3.00 | 60 | 100% | 100% | 100% | Criterion | Criterion | Criterion |
| Comparative Example 2 | 62.00 | 2.98 | 55 | 103% | 99% | 92% | Permission | Permission | No permission |
| Example 1 | 80.00 | 2.80 | 70 | 133% | 93% | 117% | Excellent | Good | Good |
| Example 2 | 75.00 | 2.75 | 68 | 125% | 92% | 113% | Good | Good | Good |
| Example 3 | 70.00 | 2.70 | 66 | 117% | 90% | 110% | Permission | Good | Permission |
| Example 4 | 67.50 | 2.68 | 65 | 113% | 89% | 108% | Permission | Excellent | Permission |
| Example 5 | 85.00 | 2.85 | 72 | 142% | 95% | 120% | Excellent | Permission | Excellent |

Examples 2 to 5

Honeycomb filters were prepared in the same method as Example 1 except that a disposition range and a disposition spot of a platinum group element-containing catalyst were changed as shown in the above Table 1. With respect to the honeycomb filters of Examples 2 to 5, "trapping efficiency performance", "pressure loss performance", and "exhaust gas purification performance" were evaluated by the same method as Example 1. The results are shown in Table 2.

Comparative Examples 1 and 2

Honeycomb filters were prepared in the same method as Example 1 except that a disposition range and a disposition spot of a platinum group element-containing catalyst were changed as shown in the above Table 1. In Comparative Examples 1 and 2, as in the following methods, the platinum group element-containing catalyst was loaded into the inner portion of pores of partition walls of a honeycomb structure. In the Comparative Example 1, first, a catalyst layer forming slurry containing a catalyst powder of aluminum oxide onto which a platinum group element is loaded, ion exchanged water, and a dispersing agent was prepared. Next, the platinum group element-containing catalyst was applied to the entire surface of partition walls of a honeycomb filter precursor by impregnating the catalyst layer forming slurry from an inflow end face and an outflow end face of the honeycomb filter precursor. Thereafter, the platinum group element-containing catalyst was fired at 500° C. to prepare the platinum group element-containing catalyst layer. In Comparative Example 2, by impregnating the above-described catalyst layer forming slurry from the outflow end efficiency performance" and the "pressure loss performance" was hardly observed, whereas the "exhaust gas purifying performance" was extremely inferior.

The honeycomb filter according to the present invention can be used as the filter for trapping the particulate matter in the exhaust gas.

DESCRIPTION OF REFERENCE NUMERALS

1 and 21: partition wall, 2 and 22: cell, 2a and 22a: inflow cell, 2b and 22b: outflow cell, 3 and 23: circumferential wall, 4 and 24: honeycomb structure, 5 and 25: plugging portion, 11 and 31: inflow end face, 12 and 32: outflow end face, 14 and 34: platinum group element-containing catalyst layer, 38: central portion, and 100 and 200: honeycomb filter.

What is claimed is:

1. A honeycomb filter, comprising:
    a honeycomb structure which has porous partition walls disposed so as to surround a plurality of cells as through channels of fluid extending from an inflow end face to an outflow end face; and
    plugging portions disposed to plug either one of end portions of each of the cells on the side of the inflow end face or the side of the outflow end face,
    wherein the cells in which the plugging portions are arranged in an end portion on the side of the outflow end face and which are opened on the side of the inflow end face are defined as inflow cells,
    the cells in which the plugging portions are arranged in end portion on the side of the inflow end face and which are opened on the side of the outflow end face are defined as outflow cells, the honeycomb structure further includes a platinum group element-containing catalyst layer constituted by an exhaust gas purifying catalyst containing a platinum group element, the platinum group element-containing catalyst layer is disposed only on a side of an inner surface of the partition walls surrounding the outflow cells, and the platinum group element-containing catalyst layer is disposed in a range of at least up to 35% with respect to an overall length of the cells starting from the outflow end face and is not disposed in a range of at least up to 30% with respect to the overall length of the cells starting from the inflow end face, in an extending direction of the cells of the honeycomb structure.

2. The honeycomb filter according to claim 1, wherein a porosity of the platinum group element-containing catalyst layer is from 50 to 90%.

3. The honeycomb filter according to claim 1, wherein a thickness of the platinum group element-containing catalyst layer is from 10 to 40 μm.

4. The honeycomb filter according to claim 1, wherein the platinum group element-containing catalyst layer is a catalyst layer containing an oxide of at least one element selected from the group consisting of aluminum, zirconium, and cerium.

5. The honeycomb filter according to claim 1, wherein in a cross section orthogonal to the extending direction of the cells of the honeycomb structure, a range within 60% of a length from a center of gravity of the cross section to a circumferential edge of the cross section is defined as a central portion of the cross section, and the platinum group element-containing catalyst layer is disposed on the partition walls present at the central portion of the cross section.

6. The honeycomb filter according to claim 1, wherein in the cross section orthogonal to the extending direction of the cells of the honeycomb structure, the platinum group element-containing catalyst layer is disposed on the partition walls which surround the outflow cells in an entire area of the cross section.

* * * * *